(12) United States Patent
Liao

(10) Patent No.: US 9,603,037 B2
(45) Date of Patent: Mar. 21, 2017

(54) METHOD OF HANDLING DELAYED SIGNALING OF TARGET MOBILE DEVICE

(71) Applicant: HTC Corporation, Taoyuan County (TW)

(72) Inventor: Ching-Yu Liao, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 448 days.

(21) Appl. No.: 13/710,402

(22) Filed: Dec. 10, 2012

(65) Prior Publication Data

US 2013/0148492 A1 Jun. 13, 2013

Related U.S. Application Data

(60) Provisional application No. 61/568,172, filed on Dec. 8, 2011.

(51) Int. Cl.
*H04W 24/04* (2009.01)
*H04W 4/00* (2009.01)

(52) U.S. Cl.
CPC .......... *H04W 24/04* (2013.01); *H04W 4/005* (2013.01)

(58) Field of Classification Search
CPC .. H04W 4/005; H04W 24/04; H04W 28/0247
See application file for complete search history.

(56) References Cited

U.S. PATENT DOCUMENTS

2005/0119008 A1* 6/2005 Haumont ............... 455/456.1
2010/0261490 A1* 10/2010 Berry et al. ............. 455/466
2011/0103310 A1 5/2011 Stojanovski
2011/0170517 A1* 7/2011 Bakker ............ H04W 36/0033 370/331
2012/0099586 A1* 4/2012 Cherian et al. ............... 370/389
2012/0302229 A1* 11/2012 Ronneke .................... 455/422.1

FOREIGN PATENT DOCUMENTS

WO 2011098150 A1 8/2011

OTHER PUBLICATIONS

3GPP TS 23.682 V0.1.0 (Nov. 2011), "3rd Generation Partnership Project; Technical Specification Group Services and System Aspects; Architecture Enhancements to facilitate communications with Packet Data Networks and Applications; (Release 11)", pp. 1-19.

(Continued)

*Primary Examiner* — Siming Liu
(74) *Attorney, Agent, or Firm* — Winston Hsu; Scott Margo

(57) ABSTRACT

A method of handling delayed signaling of a target mobile device for a first network control node is disclosed. The method comprises the first network control node receiving a request from a network gateway node; the registered network control node setting a flag and informing a data base to set the flag for the target mobile device when the first network control node fails to deliver the request to the target mobile device; and the first network control node sending the flag to a second network control node when the target mobile device is reachable in the second network control node.

9 Claims, 5 Drawing Sheets

(56) References Cited

OTHER PUBLICATIONS

3GPP TS 23.040 V10.0.0 (Mar. 2011), "3rd Generation Partnership Project; Technical Specification Group Core Network and Terminals; Technical realization of the Short Message Service (SMS) (Release 10)", pp. 1-202.

3GPP TR 23.888 V1.6.0 (Nov. 2011), "3rd Generation Partnership Project; Technical Specification Group Services and System Aspects; System Improvements for Machine-Type Communications; (Release 11)", pp. 1-161.

3GPP, "ETSI TS 129 272 V9.8.0 (Oct. 2011)", 3GPP TS 29.272 version 9.8.0 Release 9, http://www.etsi.org/deliver/etsi_ts/129200_129299/129272/09.08.00_60/ts_129272v090800p.pdf, Oct. 12, 2011, Cover page, p. 1-5 and 21-23.

Office action mailed on Jan. 28, 2015 for the Taiwan application No. 101146427, filing date Dec. 10, 2012, p. 1-5.

Office action mailed on Jul. 30, 2015 for the Taiwan application No. 101146427, filing date Dec. 10, 2012, p. 1-5.

\* cited by examiner

METHOD OF HANDLING DELAYED SIGNALING OF TARGET MOBILE DEVICE

CROSS REFERENCE TO RELATED APPLICATIONS

This application claims the benefit of U.S. Provisional Application No. 61/568,172 filed on Dec. 8, 2011 and entitled "Method of handling delayed triggers for temporary unreachable UE", the contents of which are incorporated herein.

BACKGROUND OF THE INVENTION

1. Field of the Invention

The present invention relates to a method utilized in a mobile communication environment, and more particularly, to a method of handling delayed triggering when a target mobile device or user equipment (UE) is temporarily unreachable in the mobile communication environment.

2. Description of the Prior Art

Machine-type communication (MTC) is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication. In comparison with a current mobile network communication service, the MTC can be characterized as a different market scenario, data communication, less costs and efforts, a potentially great number of MSs for communication, wide service areas, low traffic per MS, etc.

Machine-to-machine (M2M) communications may take advantage of deployed wireless networks based on Third Generation Partnership Project (3GPP) technologies such as Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M devices. Additionally, further enhancements to these technologies may provide additional opportunities for the deployment of M2M-based solutions.

A Device Trigger Delivery Gateway (DT-GW) could be a standalone physical entity or a functional entity. At least one Device Trigger Delivery Gateway is owned by and deployed in a HPLMN that supports the MTC device trigger feature for subscribed devices. The DT-GW is deployed on the boundary between the HPLMN and the public Internet. Alternatively, the DT-GW is owned and operated by a 3rd party on behalf of the HPLMN and/or deployed in the public Internet. In which case, a secure tunnelling mechanism between the DT-GW and the HPLMN is utilized.

The MTC server sends a trigger request message encapsulated in an IP packet to the appropriate DT-GW or interworking function for machine type communication (MTC-IWF). The trigger request message could contain pertinent information needed to route the trigger (e.g. device subscriber identity, trigger command/arguments, relevant device location information, security parameters, etc.). When a trigger request message is received from a submitting node (e.g. an authorized MTC server), the DT-GW or MTC-IWF should first authorize the received trigger request message; making sure it originated from a trusted MTC server and is targeted for a device for which the MTC server is authorized to trigger. The next step is for the DT-GW or MTC-IWF to determine the reachability of the MTC device. Per the requirements specified in clause 5.8 of 3GPP documentation TS 22.368 b.1.1, a trigger-able MTC device can be received in the detached state, in the attached state without a publically routable PDP context/PDN connection and in the attached state with a publically routable PDP context/PDN connection.

When the MTC server sends Device trigger request to MTC-IWF (or DT-GW), the MTC-IWF can retrieve info about registered network control node of the target triggering UE from the home subscriber server/home location register (HSS/HLR). Then the MTC-IWF forwards the Device trigger request to one of the registered network control node, e.g. MSC/SGSN/MME. If the forwarding network control node cannot deliver the trigger request to the target UE (e.g. the UE is temporarily unreachable), it replies delivery failure report to the MTC-IWF. However when the UE becomes reachable to a network control node later, it is not clear how the MTC-IWF delivers the trigger request to the UE via a network control node which may be different from the one which failed to deliver the trigger request.

The MTC-IWF can quarry a domain name server (DNS) or PDN gateway (P-GW) about the IP address of the target UE and send the trigger request via the obtained IP address in the user plane. If the user plane delivery fails, the MTC-IWF can only try to deliver trigger via T5 or T4 path in the control plane. It is not clear how the MTC-IWF delivers the trigger via the user plane if the IP address of the UE becomes reachable.

SUMMARY OF THE INVENTION

It is therefore a primary objective of the present invention to provide method of handling delayed signaling of a target mobile device.

A method of handling delayed signaling of a target mobile device for a first network control node is disclosed. The method comprises the first network control node receiving a request from a network gateway node; the registered network control node setting a flag and informing a data base to set the flag for the target mobile device when the first network control node fails to deliver the request to the target mobile device; and when the target mobile device is reachable in a second network control node, the first network control node sending the flag to the second network control node if the second network control node is not the first network control node, wherein according to a status of the flag, the second network control node is capable of determining whether to inform the data base that the target mobile device is reachable in the second network control node.

A method of handling delayed signaling of a target mobile device for a network gateway node is disclosed. The method comprises the network gateway node receiving a request from a server and storing the request; the network gateway node sending the request to a first network control node for delivering the request to the target mobile device; the network gateway node informing a data base to set a flag when the network gateway node receives a delivery failure report of the request from the first network control node; the network gateway node receiving an indication from the data base when the data base detects that the target mobile device is reachable at a second network control node and the flag is set, wherein the indication indicates the second network control node which the target mobile device registers to; and the network gateway node sending the request to the second network control node according to the received indication.

A method of handling delayed signaling of a target mobile device for a network gateway node is disclosed. The method comprises the network gateway node informing at least one of a HSS, a HLR, a PDN gateway node and a DNS to set a flag indicating a message waiting for delivery for the target mobile device when the network gateway node fails to deliver a request to the target mobile device via a first IP address of the target mobile device in user plane.

These and other objectives of the present invention will no doubt become obvious to those of ordinary skill in the art after reading the following detailed description of the preferred embodiment that is illustrated in the various figures and drawings.

DETAILED DESCRIPTION

The following description is of the best-contemplated mode of carrying out the invention. This description is made for the purpose of illustrating the general principles of the invention and should not be taken in a limiting sense. Note that the 3GPP target stations described herein are used to teach the spirit of the invention, and the invention is not limited thereto.

Figure 1:
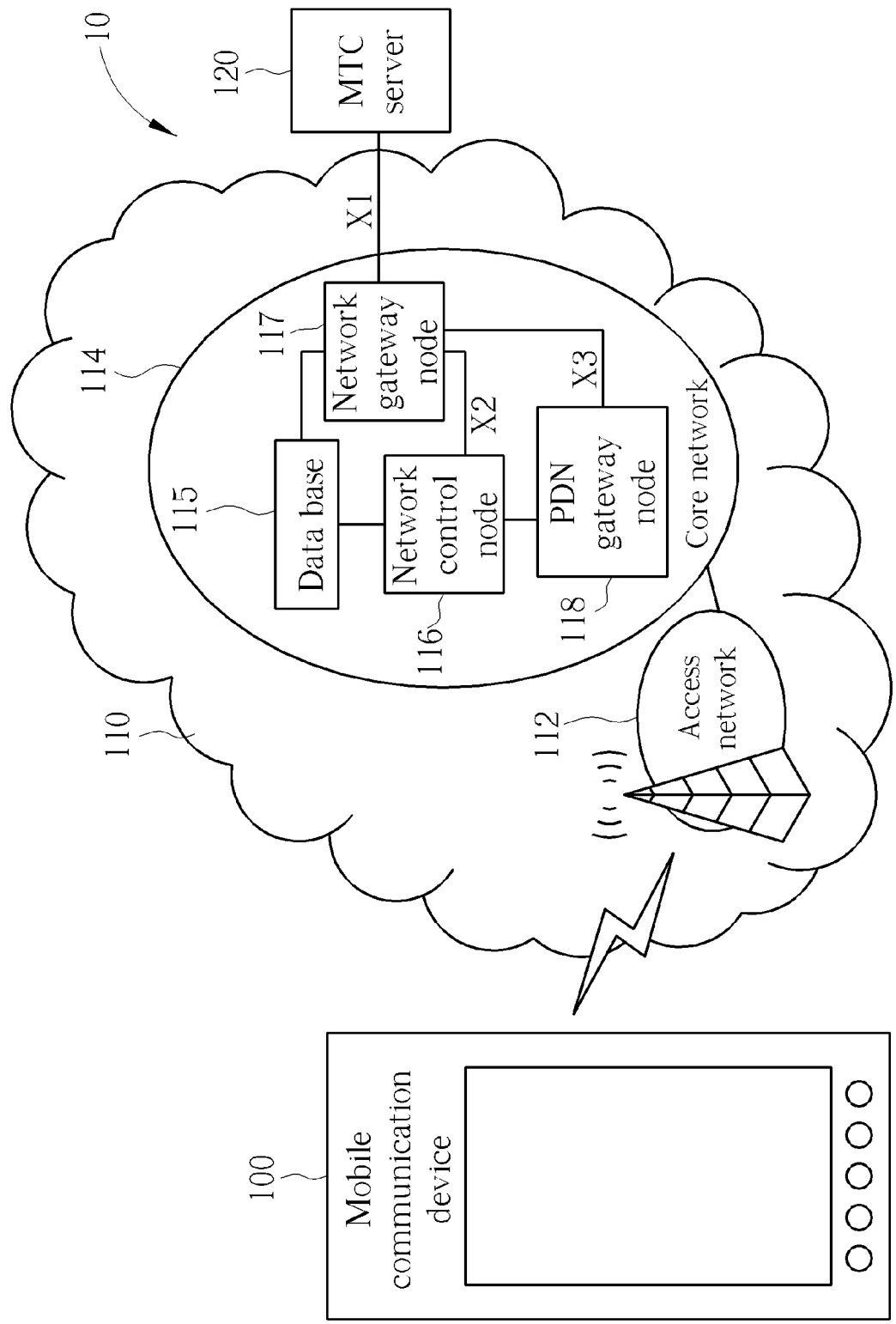
FIG. 1 is a schematic diagram of an exemplary mobile communication environment.

In order to solve the aforementioned problems, the invention provides methods for delayed signaling for temporarily unreachable mobile device, where the signaling may be related trigger messages but not limited herein and the data transmission may be with small payload which is eligible for delivering via control plane. Please note that the signaling may be for mobile device with particular MTC features, e.g. MTC monitoring, MTC device triggering, MTC small data transmission, etc, that is depending on the services requested from the MTC server. FIG. 1 is an exemplary system architecture for MTC (Machine Type Communication) which illustrates a mobile communication environment (or mobile communication system) 10 according to an example of the disclosure. The mobile communication environment 10 includes at least one mobile communication device 100, a service network 110 and a MTC server 120. In the mobile communication environment 10, the mobile communication device 100, which may be a Mobile Station (MS)/User Equipment (UE), is wirelessly connected to the service network 110 for obtaining wireless services.

In the mobile communication environment 10, the mobile communication device 100 is configured for MTC and runs an application for MTC. The mobile communication device 100 may communicate with the MTC server 120 via the service network 110 which may be a 3GPP network, e.g. Global System for Mobile Communication (GSM) network, Universal Mobile Telecommunications System (UMTS) network, or Evolved Packet System (EPS) network. The MTC server 120 may be a server capable of triggering MTC applications (also called MTC services) on the mobile communication device 100. The MTC server 120 can be further connected to one or more MTC application server via certain Application Programming Interfaces (API) and provides triggering services via the service network 110 for the connected MTC application servers. Specifically, the MTC server 120 can send a trigger request message (or called trigger indication) via the service network 110 to the mobile communication device 100 for executing target MTC application(s).

The service network 110 may comprise an access network (or called radio access network) 112 and a core network 114, wherein the access network 112 allows connectivity between the mobile communication device 100 and the core network 114 by providing the functionality of wireless transmissions and receptions to and from the mobile communication device 100 for the core network 114, and the core network 114 signals the required operations to the access network 112 for providing wireless services to the mobile communication device 100. The service network 110 may be a network in compliance with the Global System for Mobile Communication (GSM), Universal Mobile Telecommunications System (UMTS), or Evolved Packet System (EPS) technology. The access network 112 may be a GSM Edge Radio Access Network (GERAN) in the GSM technology, a UMTS Terrestrial Radio Access Network (UTRAN) in the WCDMA/HSPA technology, or an Evolved-UTRAN (E-UTRAN) in the LTE/LTE-Advanced technology, and the core network 114 may be a GSM core network, a General Packet Radio Service (GPRS) core network in the GSM/UMTS system, or an Evolved Packet Core (EPC) network in the EPS system.

The core network 114 is connected to the access network 112, which may include a network control node 116 (e.g. SGSN/MME/MSC), a data base 115 (e.g. HSS and/or HLR), a PDN gateway node 118 (e.g. P-GW/GGSN) and a network gateway node 117 (e.g. device trigger delivery gateway/MTC-IWF), for providing various services to the mobile communication device 100. Please note that the data base 115 can also be co-located with the network gateway node 117. For example, the SGSN/MME/MSC is the key network control node for packet routing and transfer, mobility management (e.g., attach/detach and location management), session management, logical link management, authentication and charging functions, and interfaces an E-UTRAN/UTRAN/GERAN for the creation of relevant radio bearers. The PDN gateway node 118 is responsible for inter-working between the UMTS or EPS network and external networks. The HSS or HLR is a central database that contains user-related and subscription-related information. HLR is responsible for enabling subscriber access, which can be considered as a subset of HSS. Functions of HSS/HLR include functionalities such as mobility management, call and session establishment support, user authentication and access authorization. The service-related entity, e.g. MTC server 120, may be inside or outside of the service network 110 and may indirectly connect to network entity, e.g. via network gateway or interworking function after appropriate authorization process, or directly connect to GGSN/PGW if user plane connection is established and remains active. Further, the core network 114 may provide different interfaces to the MTC server 120. The MTC server 120 may transmit a request message to the network gateway node 117 with interworking function (IWF) to process service request, e.g. trigger service, received from the MTC server 120 for further trigger delivery, where the network gateway node 117 is an entry point of the service network 110 to the MTC server 120 and an intermediate network control node to interface with SMS-SC (SMS service center) or network control node 116, e.g. MME/SGSN/MSC. Please note that the mobile communication device receives the request message from network control node 116 via NAS signaling connection.

Figure 2:
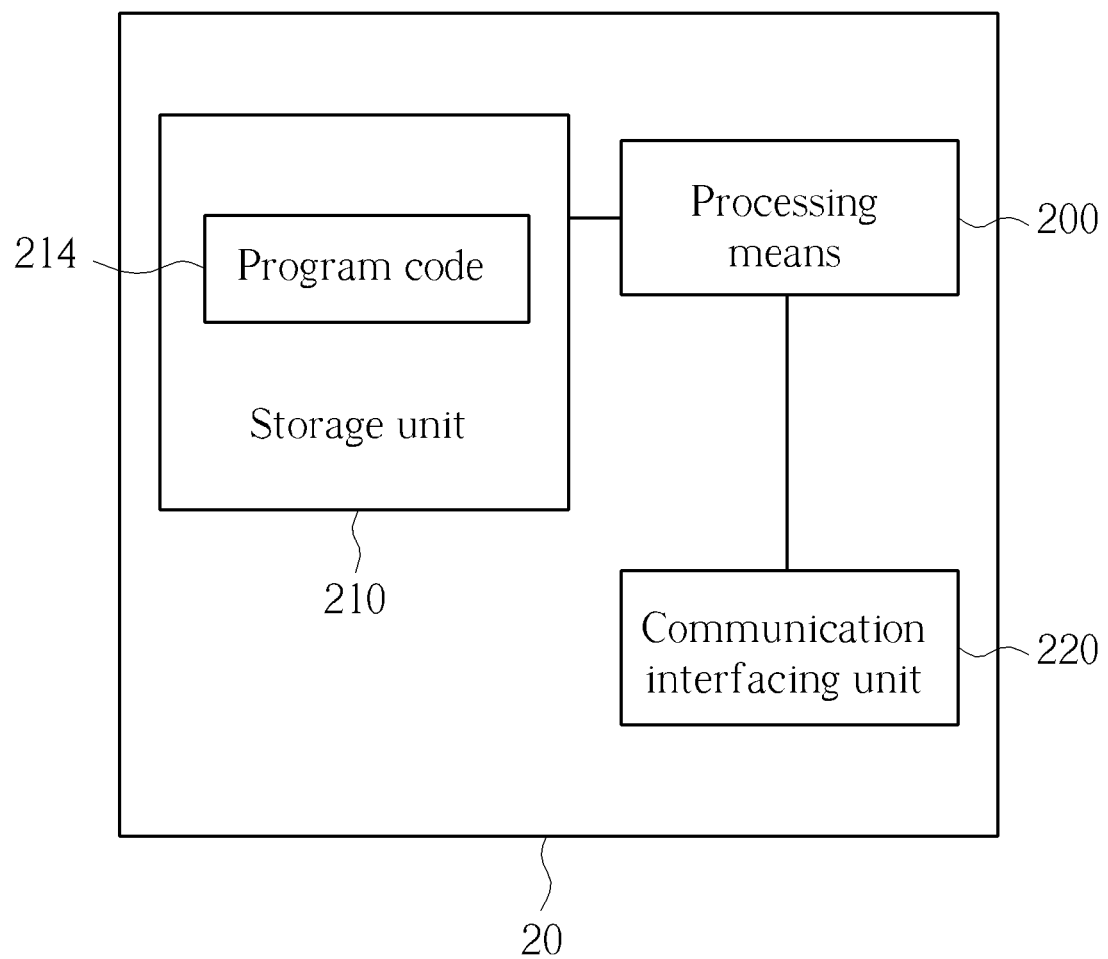
FIG. 2 is a schematic diagram of an exemplary communication device.

FIG. 2 illustrates a schematic diagram of an exemplary communication device 20. The communication device 20 may be implementation of the data base 115, the network control node 116, the network gateway node 117, the PDN gateway node 118 or the MTC server 120 shown in FIG. 1, but is not limited herein. The communication device 20 may include a processing means 200 such as a microprocessor or Application Target Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
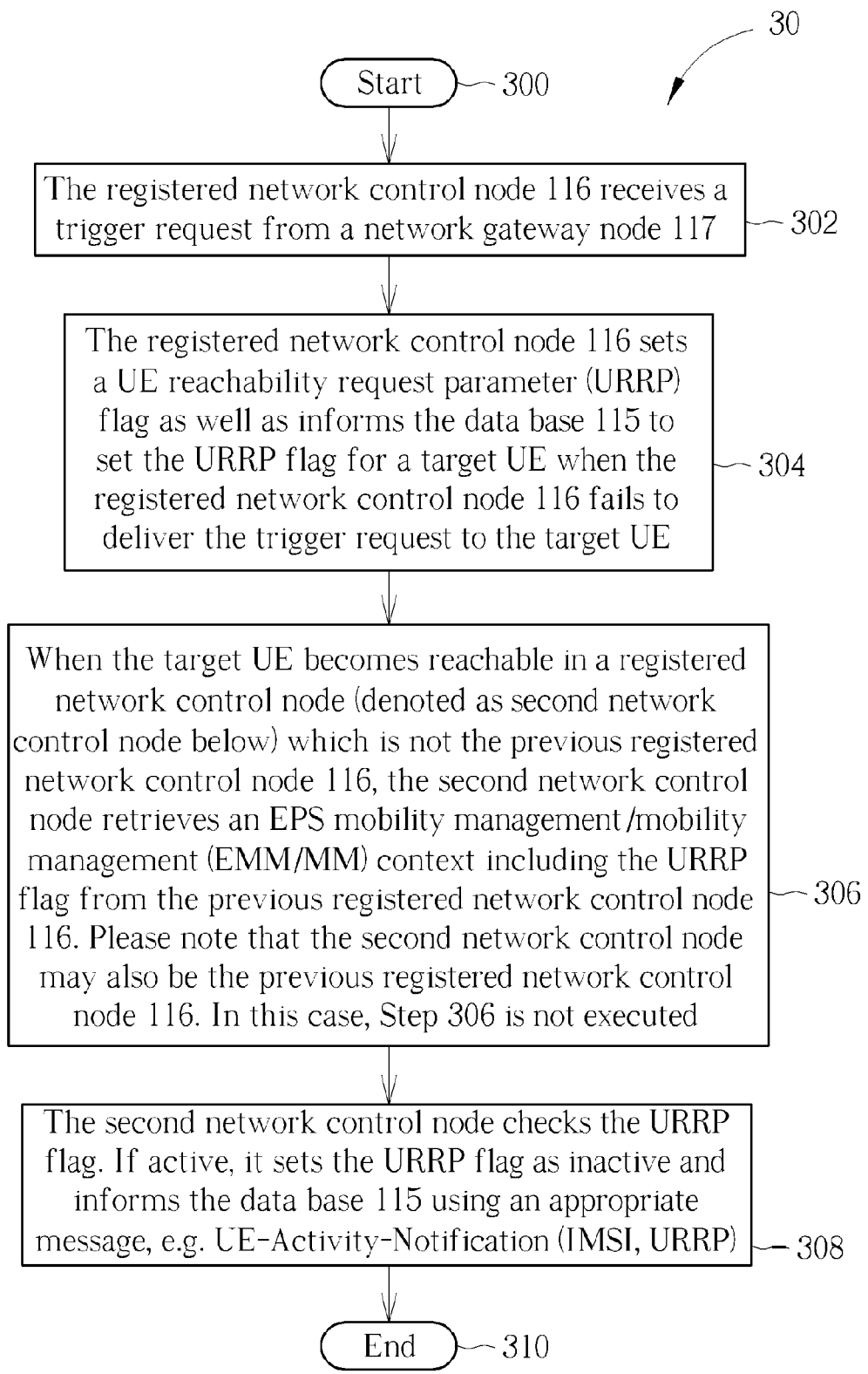
FIGS. 3-5 are flowchart diagrams of exemplary processes.

When the MTC server 120 sends a request (e.g. trigger request) to the network gateway node 117, the network gateway node 117 can retrieve registered network control node information of a target mobile device or UE from the data base 115, so as to know the target UE registers at which network control node(s) 116. A registered network control node of the target UE can be its serving network control node. Then, the network gateway node 117 forwards the request to one of the registered network control node(s) 116, e.g. MSC/SGSN/MME. If that registered network control node 116 can not deliver the request to the target UE, an exemplary process 30 can be used to handle delayed signaling of the target UE in a validity period for the registered network control node 116 when the target UE is temporarily unreachable. The validity period indicates the time period during which the request message is valid. Please refer to FIG. 3 is a flow chart of the process 30. The process 30 can be compiled into the program code 214 and includes the following steps:

Step 300: Start.

Step 302: The registered network control node 116 receives a trigger request from a network gateway node 117.

Step 304: The registered network control node 116 sets a UE reachability request parameter (URRP) flag as well as informs the data base 115 to set the URRP flag for a target UE when the registered network control node 116 fails to deliver the trigger request to the target UE.

Step 306: When the target UE becomes reachable in a registered network control node (denoted as second network control node below) which is not the previous registered network control node 116, the second network control node retrieves an EPS mobility management/mobility management (EMM/MM) context including the URRP flag from the previous registered network control node 116. Please note that the second network control node may also be the previous registered network control node 116. In this case, Step 306 is not executed.

Step 308: The second network control node checks the URRP flag. If active, it sets the URRP flag as inactive and informs the data base 115 using an appropriate message, e.g. UE-Activity-Notification (IMSI, URRP).

Step 310: End.

According to the process 30, the registered network control node 116 receives the trigger request from the network gateway node 117 (e.g. DT-GW or MTC-IWF). The trigger request may include IMSI, priority, validity period, etc. The registered network control node 116 can not deliver the trigger request because the target UE is temporarily unreachable. The registered network control node 116 sets the URRP flag as well as informs the data base 115 (e.g. HSS/HLR) to set the URRP flag for the target UE by International Mobile Subscriber Identity (IMSI) when the delivery of the trigger request fails. Such that the URRP flags are active at the registered network control node 116 and the data base 115. Also, the registered network control node 116 sends a delivery failure report, which may include a failure cause, to the network gateway node 117 to inform of the delivery failure of the trigger request. When the target UE becomes reachable in the second network control node which is not the previous registered network control node 116, the second network control node retrieves the EMM/MM context with the URRP flag from the previous registered network control node 116. Namely, the registered network control node 116 includes the URRP flag in the EMM/MM context sent to the second network control node. Since the second network control node retrieves the URRP flag from the previous registered network control node 116, the second network control node is aware of the status of the URRP flag, and can determine whether to inform the data base 115 of the reachability of the target UE according to this status. If the URRP flag is active, the serving network control node can then send an appropriate message to inform the data base 115 of the target UE being reachable at the second network control node. Preferably, the appropriate message is UE-Activity-Notification (IMSI, URRP). In this situation, the data base 115 can know that the target UE is currently reachable at the second network control node.

Figure 4:
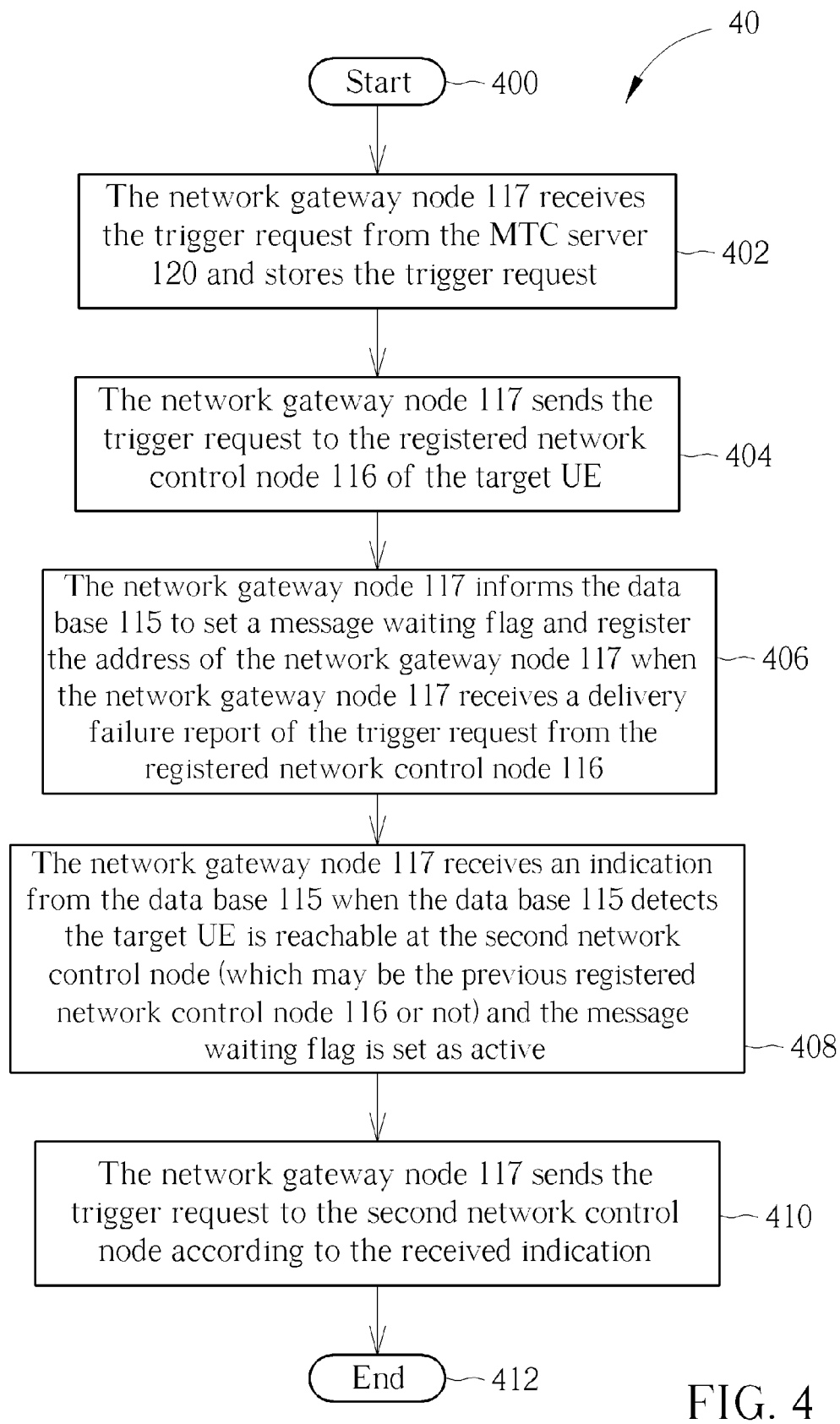

Please refer to FIG. 4, which is a flow chart of an exemplary process 40. When the MTC server 120 sends a request (e.g. trigger request) to the network gateway node 117, the process 40 can be used to handle delayed signaling of a target UE in a validity period for the network gateway node 117. The process 40 can be compiled into the program code 214 and includes the following steps:

Step 400: Start.

Step 402: The network gateway node 117 receives the trigger request from the MTC server 120 and stores the trigger request.

Step 404: The network gateway node 117 sends the trigger request to the registered network control node 116 of the target UE.

Step 406: The network gateway node 117 informs the data base 115 to set a message waiting flag and register the address of the network gateway node 117 when the network gateway node 117 receives a delivery failure report of the trigger request from the registered network control node 116.

Step 408: The network gateway node 117 receives an indication from the data base 115 when the data base 115 detects the target UE is reachable at the second network control node (which may be the previous registered network control node 116 or not) and the message waiting flag is set as active.

Step 410: The network gateway node 117 sends the trigger request to the second network control node according to the received indication.

Step 412: End.

According to the process 40, when the network gateway node 117 (e.g. DT-GW or MTC-IWF) receives the trigger request from the MTC server 120, the network gateway node 117 stores the trigger request and forwards the trigger request to the registered network control node 116 of the target UE. When the delivery of the trigger request fails, e.g. due to the temporarily unreachable UE or network control node overload/congestion, the registered network control node 116 sends the delivery failure report to the network gateway node 117. When the network gateway node 117 receives the delivery failure report of the trigger request from the registered network control node 116, the network gateway node 117 informs the database 115 (e.g. HSS/HLR) to set the message waiting flag and register the address of the network gateway node 117. It is noticed that if the target UE originally has more than one registered network control nodes 116, the network gateway node 117 may deliver the trigger request message via one or more registered network nodes 116. In this case, the network gateway node 117 may register its address and set the message waiting flag to the data base 115 when receiving failure delivery reports from the registered network control node(s) 116 for the failed delivery attempts. Further when the data base 115 receives the notification from the network gateway node 117 for the message waiting flag and the address of the network gateway node 117, it checks the URRP flag. If the URRP flag is not set as active, the data base 115 sets the URRP flag as active and initiates the UE reachability procedure by sending a notification message indicating active URRP flag and the IMSI of the target UE to the registered network control node(s) 116. Since the message waiting flag is active, the data base 115 sends an indication indicating the address of the second network control node to the network gateway node 117 when the data base 115 detects the target UE is reachable at the second network control node. The network gateway node 117 receives the indication of the second network control node address from the data base 115 and sends the stored trigger request to the second network control node accordingly. The indication indicates the second network control node which the target UE registers to. In this situation, the network gateway node 117 can deliver the trigger request to the second network control node, for example via direct delivery T5 path or via SMS delivery T4 path.

Therefore, the network gateway node 117 delivers the trigger request to the target UE via UE's registered network node (i.e. the second network control node mentioned above) that may be the same as or different from the network control node 116 that previously failed to deliver the trigger request, e.g. due to temporarily unreachable target UE or network control node overload/congestion, etc. Also when the target UE becomes available, the network gateway node 117 can also determine a delivery route based on network status, e.g. overload condition.

Briefly, when the MTC server 120 sends the trigger request to the network gateway node 117, the network gateway node 117 stores and forwards the trigger request to one of the registered network control node(s) 116 (e.g. MSC/SGSN/MME) of the target UE. If that registered network control node 116 can not deliver the trigger request successfully, e.g. due to temporary absence of the target UE or network node overload/congestion, the registered network control node 116 sets the URRP flag as well as informs the data base 115 to set the URRP flag for the target UE. Apart from that, the registered network control node 116 sends the delivery failure report to the network gateway node 117. The network gateway node 117 may attempt to deliver the trigger request via another registered network control node. When the network gateway node 117 receives the delivery failure reports of the trigger request from the registered network control node(s) 116 for attempted trigger deliveries, the network gateway node 117 informs the data base 115 to set the message waiting flag. Once the target UE becomes reachable in the registered network control node (i.e. the second network control node mentioned above) which is not the previous registered network control node 116, the second network control node retrieves the EMM/MM context with the URRP flag from the previous registered network control node 116. Please note that if the second network control node is just the previous registered network control node 116, then there is no need for the second network control node to retrieve the EMM/MM context. The second network control node sends a notification message, e.g. UE-Activity-Notification message, to inform the data base 115 of the target UE being reachable at the second network control node. The data base 115 detects the target UE is reachable at the second network control node and sends the indication to the network gateway node 117. The indication indicates to the network gateway node 117 that the target mobile device is at the second network control node. According to the indication, the network gateway node 117 can deliver the trigger request to the second network control node via delivery T5 path or via SMS delivery T4 path. The message waiting flag, the stored trigger message at the network gateway node 117, and the URRP flag at the registered network control node(s) and the data base 115 are valid before the expiry of the validity period. That is, before the expiry of the validity period, the network keeps attempting to deliver the trigger message.

Figure 5:
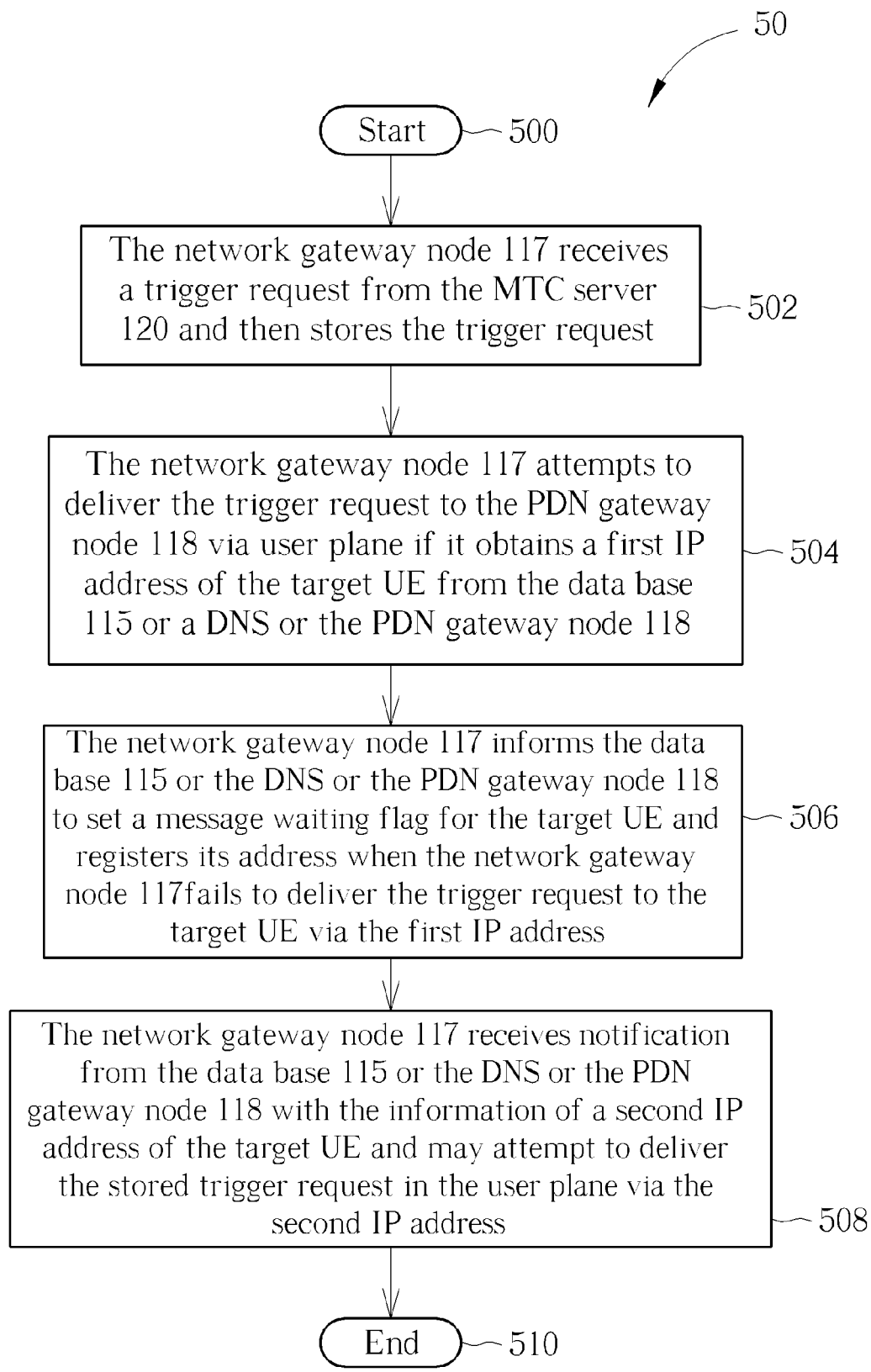

In some examples, the network gateway node 117 (e.g. MTC-IWF) can quarry a domain name server (DNS) or the PDN gateway node 118 (e.g. P-GW) about the IP address of the target UE and send the trigger request via the obtained IP address in the user plane. Please refer to FIG. 5, which is a flow chart of an exemplary process 50. The process 50 can be used to handle delayed signaling of the target UE for the network gateway node 117 when a delivery of a request (e.g. trigger request) fails in the user plane. The process 50 can be compiled into the program code 214 and includes the following steps:

Step 500: Start.

Step 502: The network gateway node 117 receives a trigger request from the MTC server 120 and then stores the trigger request.

Step 504: The network gateway node 117 attempts to deliver the trigger request to the PDN gateway node 118 via user plane if it obtains a first IP address of the target UE from the data base 115 or a DNS or the PDN gateway node 118.

Step 506: The network gateway node 117 informs the data base 115 or the DNS or the PDN gateway node 118 to set a message waiting flag for the target UE and registers its address when the network gateway node 117 fails to deliver the trigger request to the target UE via the first IP address.

Step 508: The network gateway node 117 receives notification from the data base 115 or the DNS or the PDN gateway node 118 with the information of a second IP address of the target UE and may attempt to deliver the stored trigger request in the user plane via the second IP address.

Step 510: End.

According to the process 50, the network gateway node 117 informs the data base 115 (e.g. HSS/HLR) or DNS or PDN gateway node 118 to set the message waiting flag for a target UE when failing to deliver a trigger request to the target UE via the first IP address. Since the message waiting flag is active, the data base 115 informs the network gateway node 117 of the address of the new registered network control node when the data base 115 detects activity of the target UE or the data base 115 or DNS or PDN gateway node 118 informs the network gateway node 117 of the information of the second IP address of the target UE when the data base 115 or DNS or PDN gateway node 118 updates the second IP address of the target UE. If the trigger request has not yet sent in the control plane, e.g. due to temporarily absent UE or network congestion, the network gateway node 117 can deliver the trigger request to the target UE via the second IP address in the user plane.

Furthermore, the aforementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, when the MTC server sends a request (e.g. trigger request) to the network gateway node, the network gateway node stores and forwards the request to one of the registered network control nodes. If the registered network control node cannot deliver the request due to temporary absence of the target UE, the registered network control node sets the URRP flag as well as informs the HSS/HLR to set the URRP flag for the target UE. Apart from that, the registered network control node sends the delivery failure report to the network gateway node. When the network gateway node receives the delivery failure report, the network gateway node informs the HSS/HLR to set the message waiting flag. Once the target UE becomes reachable in a new serving network control node, the new serving network control node retrieves the EMM/MM context with the URRP flag from the previous registered network control node if the new serving network control node is not the previous registered network control node. The new serving network control node informs the HSS/HLR of the target UE being reachable at the new serving network control node. When the HSS/HLR detects the target UE is reachable at the new serving network control node, the HSS/HLR sends the indication to the network gateway node. The network gateway node can deliver the request to the new serving network control node according to the indication. In some examples, the network gateway node can quarry DNS or PDN gateway node about the IP address of the target UE and send the request via the obtained IP address in the user plane. If the network gateway node fails to deliver the request via a reachable IP address in the user plane, the network gateway node informs the HSS or DNS or PDN gateway node to set the message-waiting flag for the target UE. If the HSS or DNS or PDN gateway node updates the IP address of the UE or detects the UE activity, it informs the network gateway node of the info of available IP address of the UE. If the request has not yet been sent in the control plane, the network gateway node can use the available IP address to deliver the request to the UE via the user plane.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling delayed signaling of a target mobile device for a first network control node, the method comprising:
   the first network control node receiving a request from a network gateway node for delivering the request to the target mobile device, wherein the first network control node is a Mobility Management Entity (MME), a Serving GPRS Support Node (SGSN) or a Mobile Switching Center (MSC);
   the first network control node setting a flag when the first network control node fails to deliver the request to the target mobile device;
   the first network control node informing a data base to set the flag for the target mobile device when the first network control node fails to deliver the request to the target mobile device, wherein the data base is a Home Location Register (HLR) or a Home Subscriber Server (HSS); and
   when the target mobile device is reachable in a second network control node, the first network control node sending the flag to the second network control node if the second network control node is not the first network control node, wherein the flag is configured to instruct the second network control node whether to inform the data base about reachability of the target mobile device, wherein according to a status of the flag, the second network control node is capable of determining whether to inform the data base that the target mobile device is reachable in the second network control node.

2. The method of claim 1, wherein the request corresponds to a service requested from a machine type communication (MTC) server.

3. The method of claim 1, wherein the flag is a UE Reachability Request Parameter (URRP) flag.

4. The method of claim 1 further comprising the first network control node sending a delivery failure report to the network gateway node in response to failing to deliver the request to the target mobile device.

5. The method of claim 4 further comprising:
   the network gateway node informing the data base to set a second flag in response to receiving the delivery failure report from the first network control node;
   when the second flag is set and the data base is informed that the target mobile device is reachable in the second network control node, the data base sending the network gateway node an indication to indicate that the target mobile device is reachable in the second network control node; and
   the network gateway node sending the request to the second network control node according to the received indication.

6. A method of handling delayed signaling of a target mobile device for a network gateway node, the method comprising:
   the network gateway node receiving a request from a server and storing the request;

the network gateway node sending the request to a first network control node for delivering the request to the target mobile device, wherein the first network control node is a Mobility Management Entity (MME), a Serving GPRS Support Node (SGSN) or a Mobile Switching Center (MSC);

the network gateway node informing a data base to set a flag when the network gateway node receives a delivery failure report of the request from the first network control node, wherein the data base is a Home Location Register (HLR) or a Home Subscriber Server (HSS);

the network gateway node receiving an indication from the data base when the data base detects that the target mobile device is reachable at a second network control node and the flag is set, wherein the indication indicates the second network control node which the target mobile device registers to; and the network gateway node sending the request to the second network control node according to the received indication.

7. The method of claim 6, wherein the server is a machine type communication (MTC) server, and the request corresponds to a service requested from the MTC server.

8. The method of claim 6, wherein the informing step further comprising:

the network gateway node informing the data base of address information of the network gateway node when the network gateway node receives the delivery failure report.

9. The method of claim 6 further comprising the network gateway node determining a delivery route of the request according to a network status.

* * * * *